United States Patent
Kim et al.

(10) Patent No.: US 11,727,591 B2
(45) Date of Patent: Aug. 15, 2023

(54) METHOD AND APPARATUS WITH IMAGE DEPTH ESTIMATION

(71) Applicant: SAMSUNG ELECTRONICS CO., LTD., Suwon-si (KR)

(72) Inventors: Seungeon Kim, Incheon (KR); Hyunsung Chang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 405 days.

(21) Appl. No.: 17/116,063

(22) Filed: Dec. 9, 2020

(65) Prior Publication Data
US 2022/0036573 A1 Feb. 3, 2022

(30) Foreign Application Priority Data
Jul. 29, 2020 (KR) .......................... 10-2020-0094598

(51) Int. Cl.
*G06K 9/00* (2022.01)
*G06T 7/593* (2017.01)
(Continued)

(52) U.S. Cl.
CPC ............... *G06T 7/593* (2017.01); *G06N 3/08* (2013.01); *G06N 7/01* (2023.01);
(Continued)

(58) Field of Classification Search
CPC ........... G06T 7/593; G06T 2207/10021; G06T 2207/20076; G06T 2207/20081; G06T 2207/20084; G06N 7/01; G06N 3/08
(Continued)

(56) References Cited

U.S. PATENT DOCUMENTS 9,514,566 B2 12/2016 Hayes
9,699,434 B2* 7/2017 Kim ........................ G06F 18/22
(Continued)

FOREIGN PATENT DOCUMENTS

JP 2007-079664 A 3/2007
KR 10-2011-0093616 8/2011

OTHER PUBLICATIONS

Madhuanand, L., et al. "Deep learning for monocular depth estimation from UAV images." ISPRS Annals of the Photogrammetry, Remote Sensing and Spatial Information Sciences 2 (2020). (Year: 2020).*

(Continued)

*Primary Examiner* — Jonathan S Lee
(74) *Attorney, Agent, or Firm* — NSIP Law

(57) ABSTRACT

A method and apparatus with image depth estimation are provided. The method includes obtaining a first statistical value associated with a depth for each of plural pixels included in an input image based on a first channel of output data obtained by applying the input image to a neural network, obtaining a second statistical value associated with a depth for each of the plural pixels in the input image based on a second channel of the output data, and estimating depth information of each of the plural pixels in the input image based on the first statistical value and the second statistical value. The neural network may be trained based on a probability distribution for a depth of each pixel in an image based on a first statistical value and a second statistical value that are obtained corresponding to an image with predetermined depth information in the training data.

37 Claims, 9 Drawing Sheets

(51) Int. Cl.
*G06N 3/08* (2023.01)
*G06N 7/01* (2023.01)

(52) U.S. Cl.
CPC ............... *G06T 2207/10021* (2013.01); *G06T 2207/20076* (2013.01); *G06T 2207/20081* (2013.01); *G06T 2207/20084* (2013.01)

(58) Field of Classification Search
USPC .......................................................... 382/154
See application file for complete search history.

(56) References Cited

U.S. PATENT DOCUMENTS

| | | | |
|---|---|---|---|
| 10,353,271 | B2 | 7/2019 | Wang et al. |
| 2011/0150447 | A1 | 6/2011 | Li |
| 2012/0140819 | A1 | 6/2012 | Kim et al. |
| 2017/0223334 | A1 | 8/2017 | Nobayashi |
| 2018/0286064 | A1 | 10/2018 | Liu et al. |
| 2019/0302963 | A1 | 10/2019 | Harrison et al. |
| 2021/0144355 | A1 | 5/2021 | Kim et al. |

OTHER PUBLICATIONS

Garg, Rahul, et al. "Learning single camera depth estimation using dual-pixels." Proceedings of the IEEE/CVF International Conference on Computer Vision. 2019. (Year: 2019).*

Haris, Sallehuddin Mohamed, Muhammad Khalid Zakaria, and Mohd Zaki Nuawi. "Depth estimation from monocular vision using image edge complexity." 2011 IEEE/ASME International Conference on Advanced Intelligent Mechatronics (AIM). IEEE, 2011. (Year: 2011).*

Song, Chuanxue, et al. "Unsupervised monocular depth estimation method based on uncertainty analysis and retinex algorithm." Sensors 20.18 (2020): 5389. (Year: 2020).*

Su, Che-Chun, Lawrence K. Cormack, and Alan C. Bovik. "Bayesian depth estimation from monocular natural images." Journal of vision 17.5 (2017): 22-22. (Year: 2017).*

Alhashim, Ibraheem, and Peter Wonka. "High quality monocular depth estimation via transfer learning." arXiv preprint arXiv: 1812.11941 (2018). (Year: 2018).*

Godard, et al. "Unsupervised monocular depth estimation with left-right consistency." *Proceedings of the IEEE conference on computer vision and pattern recognition*. Sep. 13, 2016. (9 pages in English).

Heo, et al. "Monocular depth estimation using whole strip masking and reliability-based refinement." *Proceedings of the European Conference on Computer Vision (ECCV)*. 2018. (17 pages in English).

Brickwedde, et al. "Mono-sf: Multi-view geometry meets single-view depth for monocular scene flow estimation of dynamic traffic scenes." *Proceedings of the IEEE/CVF International Conference on Computer Vision*. 2019. (11 pages in English).

Poggi, et al. "On the uncertainty of self-supervised monocular depth estimation." *Proceedings of the IEEE/CVF Conference on Computer Vision and Pattern Recognition*. May 13, 2020. (26 pages in English).

Kim, et al. "Probabilistic TSDF Fusion Using Bayesian Deep Learning for Dense 3D Reconstruction with a Single RGB Camera." *2020 IEEE International Conference on Robotics and Automation (ICRA)*. IEEE, May 31-Aug. 31, 2020 Paris, France. (7 pages in English).

Extended European Search Report dated Jul. 6, 2021 in counterpart European Patent Application No. 21153309.6 (13 pages in English).

Michele Mancini, et al., "J-MOD2: Joint Monocular Obstacle Detection and Depth Estimation" *IEEE Robotics and Automation Letters*. Dec. 13, 2017 (8 pages in English).

Ariel Gordon, et al., "Depth from Videos in the Wild: Unsupervised Monocular Depth Learning from Unknown Cameras" *The IEEE International Conference on Computer Vision (ICCV)*, 2019, pp. 8977-8986. Apr. 10, 2019 (17 pages in English).

Clément Godard, et al., "Digging Into Self-Supervised Monocular Depth Estimation" *Computer Vision and Pattern Recognition*. Aug. 17, 2019 (18 pages in English).

* cited by examiner

METHOD AND APPARATUS WITH IMAGE DEPTH ESTIMATION

CROSS-REFERENCE TO RELATED APPLICATIONS

This application claims the benefit under 35 USC § 119(a) of Korean Patent Application No. 10-2020-0094598, filed on Jul. 29, 2020, in the Korean Intellectual Property Office, the entire disclosure of which is incorporated herein by reference for all purposes.

BACKGROUND

1. Field

The following description relates to a method and apparatus with image depth estimation.

2. Description of Related Art

Depth information of an image may include information about a distance between a camera and an object. Understanding a geometric structure (for example, a location of a vanishing point, or a horizontal boundary) may be used to understand a scene, for example, to analyze a location of an object or a three-dimensional (3D) relationship between objects.

A human may have an impression or appreciation for a distance to an object viewed with both eyes, through parallax that is a displacement for the object. With such a principle, depth information of an object in an image may be computationally estimated by a computer considering parallax of two two-dimensional (2D) images using stereo images captured by two cameras that are in different locations on an x-axis, that is, a horizontal axis. In other words, depth information of an image may typically be obtained based on a geometric relationship between two images captured at different positions by two cameras. However, a depth estimation technology using stereo images requires two images, and an operation to match the two images is required in the previous computational approaches.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural network apparatus includes a camera configured to capture an input image and one or more processors configured to apply the input image to a neural network, obtain a first statistical value associated with a depth of a pixel included in the input image, obtain another first statistical value associated with a depth of another pixel included in the input image, obtain a second statistical value associated with the depth of the pixel included in the input image, obtain another second statistical value associated with the depth of the other pixel included in the input image, estimate depth information of the pixel included in the input image based on the first statistical value and the second statistical value, and estimate depth information of the other pixel included in the input image based on the other first statistical value and the other second statistical value, wherein the first statistical value and the other first statistical value are of a same first type of statistical value, and the second statistical value and the other second statistical value are a same second type of statistical value different from the first type of statistical value.

The second statistical value may represent a confidence in the first statistical value, and the other second statistical value may represent a confidence in the other first statistical value.

The second statistical value may be a standard deviation or variation for the depth value of the pixel included in the input image, and the other second statistical value may be a standard deviation or variation for the depth value of the other pixel included in the input image.

The one or more processors may be further configured to selectively, dependent on the represented confidence by the second statistical value, perform a correction of the first statistical value, selectively, dependent on the represented confidence by the other second statistical value, perform a correction of the other first statistical value.

The one or more processors may be further configured to generate a reconstructed input image from a reference image, the generating being dependent on the first statistical value, the second statistical value, the other first statistical value, and the other second statistical value, and perform training of the neural network based on a comparison result of the generated reconstructed input image and the input image.

The first statistical value and the other first statistical value may be obtained from image information output by the neural network as a first channel with the first statistical value and the other first statistical value, and the second statistical value and the other second statistical value may be obtained from image information output by the neural network as a second channel with the second statistical value and the other second statistical value.

In a general aspect, a neural network method includes obtaining a first statistical value associated with a depth for each of plural pixels included in an input image based on a first channel of output data obtained by applying the input image to a neural network, obtaining a second statistical value associated with a depth for each of the plural pixels in the input image based on a second channel of the output data, and estimating depth information of each of the plural pixels in the input image based on the first statistical value and the second statistical value.

Each first statistical value may be a mean of depth values of a corresponding each of the plural pixels in the input image, based on probabilities of the depth values, and each second statistical value may be a variance or a standard deviation of the depth values of the corresponding each of the plural pixels in the input image, based on the probabilities of the depth values.

The estimating of the depth information may include determining a confidence level of each of the first statistical values based on a corresponding second statistical value for each of the plural pixels in the input image, and respectively determining whether to use each of the first statistical values as depth information based on the correspondingly determined confidence level of each of the first statistical values.

With respect to the determining of the confidence level of each of the first statistical values, there may be an inverse relationship between the determined confidence levels and the corresponding second statistical values in that when values of second statistical values increase corresponding confidence levels decrease, and when other values of the second statistical value decrease corresponding confidence levels increase.

The estimating of the depth information may include obtaining a probability distribution based on a first statistical value for a depth of a pixel in the input image and a corresponding second statistical value of the first statistical value for the depth of the pixel, and performing random sampling based on the probability distribution to correct the first statistical value for the pixel.

The performing of the random sampling may be selectively performed dependent on a confidence level, of the first statistical value for the depth of the pixel, as represented by the corresponding second statistical value.

The method may further include capturing the input image using a camera of a terminal, and generating three-dimensional (3D) location information corresponding to the terminal and a surrounding object included in the input image, based on the estimated depth information.

The input image may include at least one of a monocular image and a stereo image.

In a general aspect, one or more embodiments include a non-transitory computer-readable storage medium storing instructions that, when executed by a processor, cause the processor to perform one or more or all operations described herein.

In a general aspect, a neural network method includes obtaining a first statistical value and a second statistical value associated with a depth, for each of plural pixels included in an input image, by applying the input image to a neural network, obtaining a probability distribution for a depth of each of the plural pixels in the input image, based on the first statistical value and the second statistical value, and training the neural network using an objective function that is based on the obtained probability distribution and predetermined depth information of each of the plural pixels in the input image.

Each first statistical value may be a mean of depth values of a corresponding each of the plural pixels in the input image, based on probabilities of the depth values, and each second statistical value may be a variance or a standard deviation of the depth values of the corresponding each of the plural pixels in the input image, based on the probabilities of the depth values.

The obtaining of the first statistical value and the second statistical value may include obtaining each of the first statistical values based on a first channel of output data of the neural network to which the input image is applied, and obtaining each of the second statistical values based on a second channel of the output data.

The obtaining of the first statistical value may include applying a feature map, extracted from the input image by a previous portion of the neural network, to a first network included in the neural network, and the obtaining of the second statistical value may include applying the feature map to a second network included in the neural network.

The training of the neural network may include estimating depth information of each of the plural pixels in the input image based on the probability distribution and a reference image corresponding to the input image, and training the neural network using an objective function that is based on the estimated depth information and the predetermined depth information of each of the plural pixels in the input image.

The reference image may include at least one of a stereo image, and a monocular video and pose information of a camera used to capture the monocular video.

The training of the neural network may further include obtaining the predetermined depth information, of each of the plural pixels in the input image, based on the input image and a reference image corresponding to the input image.

The training of the neural network may further include synthesizing an output image based on the probability distribution and a reference image corresponding to the input image, and training the neural network using an objective function that is based on the input image and the synthesized output image.

The synthesizing of the output image may include, based on a probability distribution for a depth of a first pixel in the input image and pixels corresponding to the depth of a corresponding first pixel in the reference image, generating a second pixel in the output image corresponding to the first pixel.

The generating of the second pixel may include generating the second pixel by calculating a weighted sum of values of the pixels corresponding to the depth of the corresponding first pixel in the reference image, based on the probability distribution for the depth of the first pixel.

The training of the neural network may include training the neural network using an objective function for minimizing a difference between a first pixel in the input image and a corresponding first pixel in the output image.

The training of the neural network may include generating a mask corresponding to each of the plural pixels in the input image, based on the respective first statistical value and the respective second statistical value, and training the neural network using the mask and the objective function.

The training of the neural network may include performing optimization of parameters for each of plural layers in the neural network, dependent on the objective function.

The input image may include at least one of a monocular image and a stereo image.

In a general aspect, a neural network apparatus includes one or more processors configured to obtain a first statistical value associated with a depth for each of plural pixels included in an input image based on a first channel of output data obtained by applying the input image to a neural network, obtain a second statistical value associated with a depth for each of the plural pixels in the input image based on a second channel of the output data, and estimate depth information of each of the plural pixels in the input image based on the first statistical value and the second statistical value.

Each first statistical value may include a mean of depth values of a corresponding each of the plural pixels in the input image, based on probabilities of the depth values, and each second statistical value may include a variance or a standard deviation of the depth values of the corresponding each of the plural pixels in the input image, based on the probabilities of the depth values.

For the estimation of the depth information, the one or more processors may be configured to determine a confidence level of each of the first statistical values based on a corresponding second statistical value for each of the plural pixels in the input image, and respectively determine whether to use each of the first statistical values as depth information based on the correspondingly determined confidence level of each of the first statistical values.

The apparatus may further include a camera configured to capture the input image,
and the one or more processors may be configured to generate three-dimensional (3D) location information corresponding to the apparatus and a surrounding object included in the input image, based on the estimated depth information.

The input image may include at least one of a captured monocular image and an image of a captured stereo image.

The one or more processors may be further configured to train the neural network based on a probability distribution that is obtained corresponding to a first image in training data based on obtained first statistical values and second statistical values that are associated with a depth of each pixel in the first image.

For the obtaining of the first statistical values, the one or more processors may be configured to obtain each of the first statistical values from a first channel of output data of the neural network to which the input image is applied, for the obtaining of the second statistical values, the one or more processors may be configured to obtain each of the second statistical values from a second channel of the output data of the neural network, and the output of the neural network may represent the neural network as having been trained on a probability distribution that is obtained corresponding to a first image in training data based on obtained first statistical values and second statistical values that are associated with a depth of each pixel in the first image.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
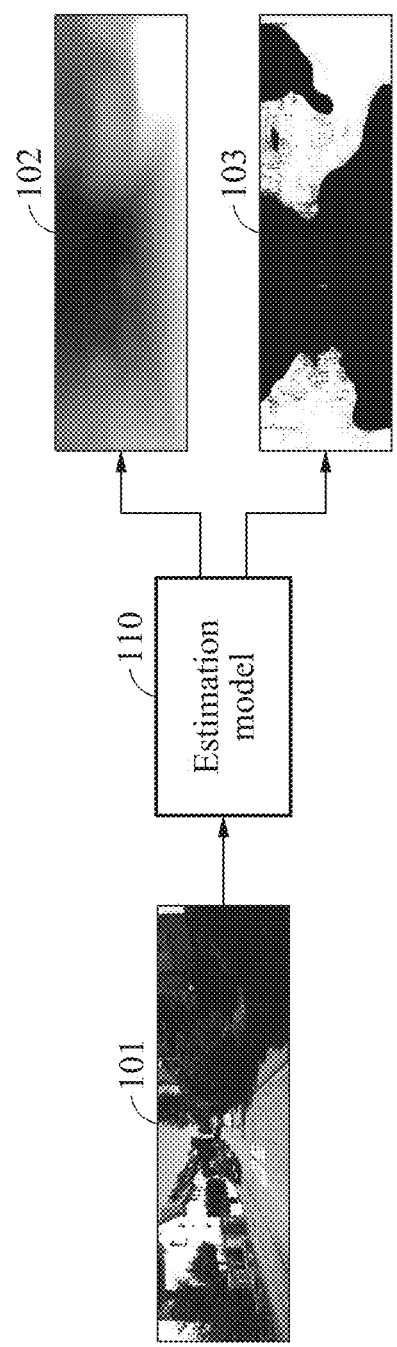
FIG. 1 illustrates an example of a model to estimate a depth of an image.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the present disclosure may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, some examples will be described in detail with reference to the accompanying drawings. Various modifications may be made to the examples. Here, the examples are not construed as limited to the disclosure and should be understood to include all changes, equivalents, and replacements within the idea and the technical scope of the disclosure.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. Outside of reference to units of measure or categorization, the "unit" term used in any embodiments indicates a unit for processing at least one function or operation, where the unit is hardware or a combination of hardware and software. The use of the term "may" herein with respect to an example or embodiment (for example, as to what an example or embodiment may include or implement) means that at least one example or embodiment exists where such a feature is included or implemented, while all examples are not limited thereto.

In addition, terms such as first, second, A, B, (a), (b), and the like may be used herein to describe components. Each of these terminologies is not used to define an essence, order, or sequence of a corresponding component but used merely to distinguish the corresponding component from other component(s). Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined herein, all terms used herein including technical or scientific terms have the same meanings as those generally understood by one of ordinary skill in the art and after an understanding of the present disclosure. Terms defined in dictionaries generally used should be construed to have meanings matching contextual meanings in the related art and the present disclosure and are not to be construed as an ideal or excessively formal meaning unless otherwise defined herein.

When describing the examples with reference to the accompanying drawings, like reference numerals refer to like constituent elements and a repeated description related thereto will be omitted. In the description of examples, detailed description of related structures or functions understood, after an understanding of the present disclosure, will be omitted when it is deemed that such description could potentially cause an ambiguous interpretation of the present disclosure.

A component in one example having an alike function with a component included in another example is described using a like name in the other example. Thus, unless otherwise described, description made in one example may be applicable to another example and detailed description within a redundant range is omitted.

FIG. 1 illustrates an example of a model 110 to estimate a depth of an image.

Referring to FIG. 1, the model 110 to estimate a depth of an image, hereinafter referred to as an "estimation model" 110, may include a learned model configured to output plural types of information, for example, a first type of a first statistical value 102 and a different second type of a second statistical value 103, about depths of pixels included in an image using, for example, a pre-trained machine learning model, such as a neural network, for an input image 101. As a non-limiting example and for convenience of explanation, examples below will describe the learned model as being the example neural network.

The input image 101 may be a two-dimensional (2D) image or a video captured by a camera, and may include, as a non-limiting example, a monocular image captured by a monocular camera. The monocular image may be a single image captured by a single camera. The estimation model 110 may correspond to a model configured to receive, as an input, a monocular image and output depth information corresponding to each pixel in the monocular image.

A depth of an image may be a value corresponding to a distance between a corresponding object in the image and a camera used to capture the image, and may be represented in units of pixels of the image herein. For example, the depth of the image may be represented as a depth map including values of depths for each of the pixels in the image. The depth map may be a single channel of an image or a single image containing information associated with a distance between an observation point and a surface of an object. For example, the depth map may correspond to a data structure in which a value of a depth corresponding to each pixel included in an image is stored and that may have a size corresponding to a number of pixels included in the input image, and a value of a depth corresponding to each pixel in the image may correspond to an image represented by, for example, a grayscale. In a typical stereo system, a depth of an image may be estimated based on a disparity, that is, a difference in position between corresponding points in an image (hereinafter, referred to as a "right image") captured by a right camera and an image (hereinafter, referred to as a "left image") captured by a left camera. In such a stereo system, depth information of the image may include disparity information, and a depth value of a pixel in the image may be expressed as a corresponding disparity value. In addition, herein a probability for a depth of a pixel in the image may correspond to a probability for a corresponding disparity.

Referring back to FIG. 1, the information, for example, the first statistical value 102 and the second statistical value 103, about depths of the pixels in the image output from the example neural network may include respective statistical values based on probabilities of depth values of the pixels in the image. For example, a first type of statistical values may include a mean of the depth values of the pixels, and a second type of statistical values may include a variance or a standard deviation of the depth values of the pixels. The first statistical value 102 that is one of outputs of the neural network may indicate information about an estimated depth value of each pixel, and the second statistical value 103 that is another output, different from the first statistical value 102, may indicate information about a confidence level of the estimation of the depth of each pixel. For example, in an example with a first statistical value output corresponding to a predetermined pixel being an estimation of a mean of depth values of the pixel based on probabilities of the depth values of the pixel, the first statistical value may indicate an estimated depth value of the pixel. For example, in an/the example with a second statistical value output corresponding to a predetermined pixel being a variance of depth values of the pixel based on probabilities of the depth values of the pixel, the second statistical value may indicate information about a confidence level of the estimation of the depth value of the pixel. In this example, an increase in variance may indicate a decrease in the confidence of the estimated depth value, and a decrease in the variance may indicate an increase in the confidence level of the estimated depth value.

Each of the outputs of the neural network may be or correspond to an image representing the respective statistical values of each pixel in the corresponding image, for example, as respective grayscale images. Thus, a grayscale image of the first statistical values, e.g., as a grayscale image of the second statistical values, would be output/generated by the neural network.

The estimation model 110 may be implemented as the example neural network to estimate, from an input image, a probabilistic characteristic of depth corresponding to each pixel in the corresponding output image. The neural network may include an input layer, at least one hidden layer, and one or more output layers. Each layer of the neural network may include at least one node, and a relationship between a plurality of nodes may be nonlinearly defined. The neural network may be designed as, for example, a deep neural network (DNN), a convolutional neural network (CNN), or a recurrent neural network (RNN), and may include various artificial neural network structures. As noted, the neural network may output two or more types of probabilistic characteristics, e.g., as two or more output channels to output the two or more types of probabilistic characteristics.

Figure 2:
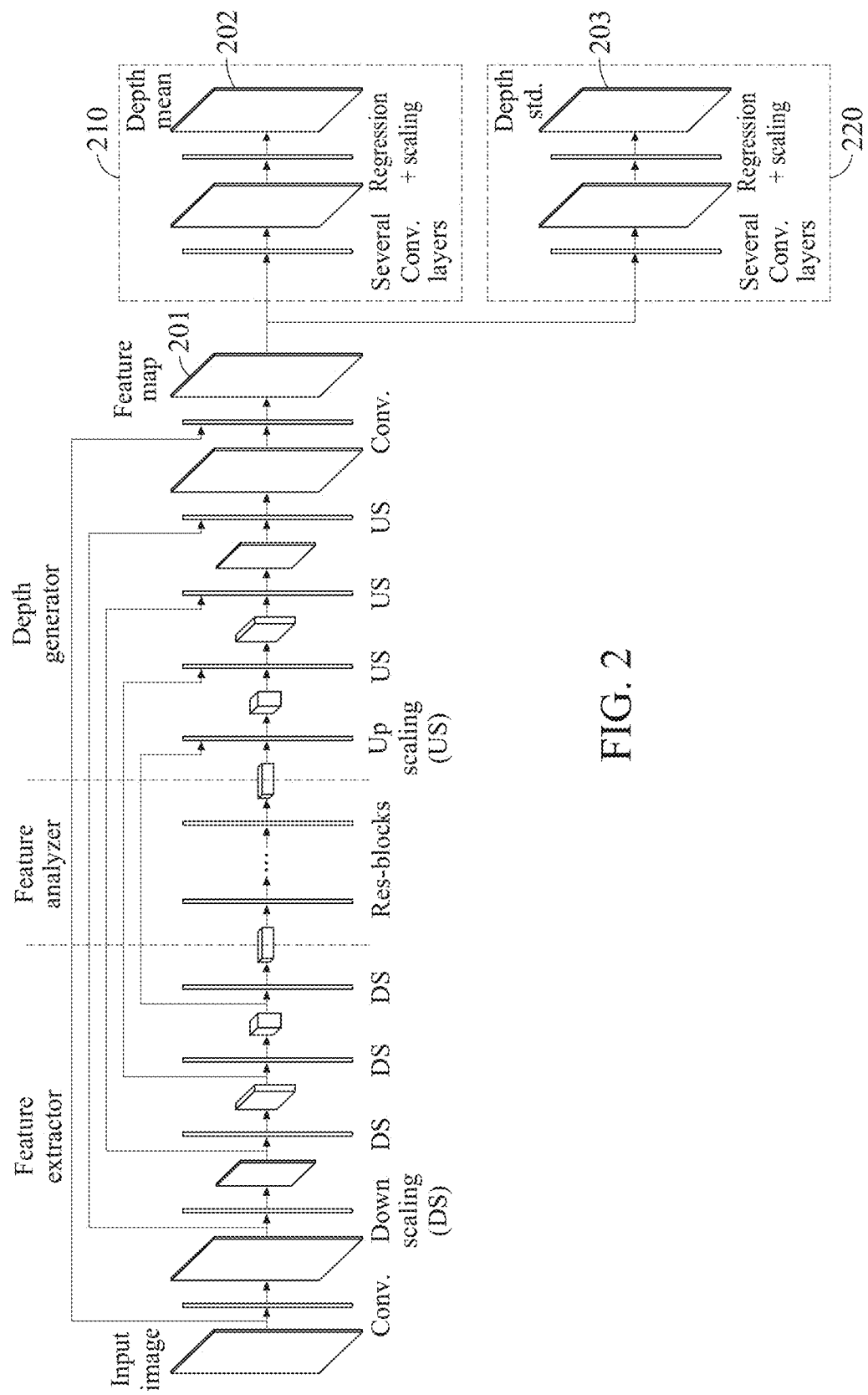
FIG. 2 illustrates an example of a structure of a neural network.

FIG. 2 illustrates an example structure of a neural network, e.g., configured based on a U-net in a form of an hourglass. The neural network of FIG. 2 is merely an example of a structure of the neural network. Examples of the structures of the neural network are not limited thereto, and may include various structures of the neural network.

Referring to FIG. 2, the neural network may include at least one layer to extract a feature map 201 from an input image, and may include a first network 210, e.g., of one or more connected layers, to obtain a first statistical value 202 based in the feature map 201 and a second network 220, e.g., as one or more other connected layers, to obtain a second statistical value 203 based on the feature map 201. For example, the first network 210 may operate in parallel with the second network 220, where both include input connections of the extracted feature map 201. Although an example in which the first network 210 and the second network 220 are included to output a first statistical value and a second statistical value in the neural network of an estimation model is shown in FIG. 2, examples include the neural network being configured to include two output channels. For example, the neural network may be designed to include, as output channels, a first channel for the first statistical value and a second channel for the second statistical value. Thus, either, or only one, of the illustrated first network 210 and the second network 220 may represent such an alternate option of the outputting of a multi-channel output to output the first statistical value 202 in one channel, and to output the second statistical value 203 in a different channel.

Referring to FIG. 2, layers included in a neural network may be associated with predetermined functions, and may be classified according to functions. For example, in the neural network, downscaling (DS) layers may be classified as a feature extractor, Res-blocks (residual blocks or ResNet architectures) may be classified as a feature analyzer, and upscaling (US) layers may be classified as a depth generator. However, classifying the layers or portions of the neural network according to functions is for convenience of description, not for limiting the structure of the neural network.

The neural network may be trained such that each of two or more output channels may estimate respective values with appropriate meaning. Each of the output channels may be trained by reflecting a meaning of each channel to a target objective function until sufficiently optimized in the neural network, e.g., according to respective accuracy thresholds.

For convenience of explanation, noting that the same is not intended to be limiting, below descriptions discuss an example in which an output of a neural network includes two channels, one channel associated with first statistical values and one channel associated with second statistical values, where a first statistical value is a mean and a second statistical value is a variance.

A training method for depth estimation of an image may include obtaining a first statistical value and a second statistical value associated with a depth for each pixel included in an input image by applying the input image to the neural network, obtaining a probability distribution associated with a depth of each pixel in the input image based on the first statistical value and the second statistical value, and training the neural network using an objective function that is based on the obtained probability distribution and actual (or labeled) depth information of each pixel in the input image.

Training data for training of the neural network may include a training input image and actual depth information of the input image. For example, the actual depth information of the input image may be obtained from a reference image corresponding to the training input image. The reference image may be an image corresponding to the training input image from which the actual depth information of the input image may be obtained. For example, when the training input image is an image having been captured by a left camera in a stereo system, an image captured by a right camera may be the reference image. In an example, a video including photographing information (for example, a camera pose) of a camera may be the reference image. In other words, the training data may include the training input image and the actual depth information of the input image, or may include the training input image and the reference image that can be used for obtaining the actual depth information of the training input image.

A method of training the neural network may include an optimization process by calculating a gradient that minimizes a difference between depth information estimated in the neural network and actual depth information of a training input image, e.g., using a video database (DB) or a stereo image DB in which training data is stored. Based on the estimated depth information and the actual depth information of the training input image, a loss of the neural network may be determined or generated using a pre-designed objective function, and a gradient may be generated based on the determined or generated loss. The generated gradient may be employed to incrementally optimize and train parameters of the neural network. For example, the neural network may be trained by, as a non-limiting example, a gradient decent scheme.

The difference between the estimated depth information and the actual depth information of the training input image may include a difference between the training input image and an output image generated based on the reference image and the estimated depth information. In other words, the loss of the neural network may be determined or generated based on the reference image and the output image. The loss based on the reference image and the output image may include a loss determined or generated based on features extracted from the training input image and a feature extracted from the reference image.

Figure 3:
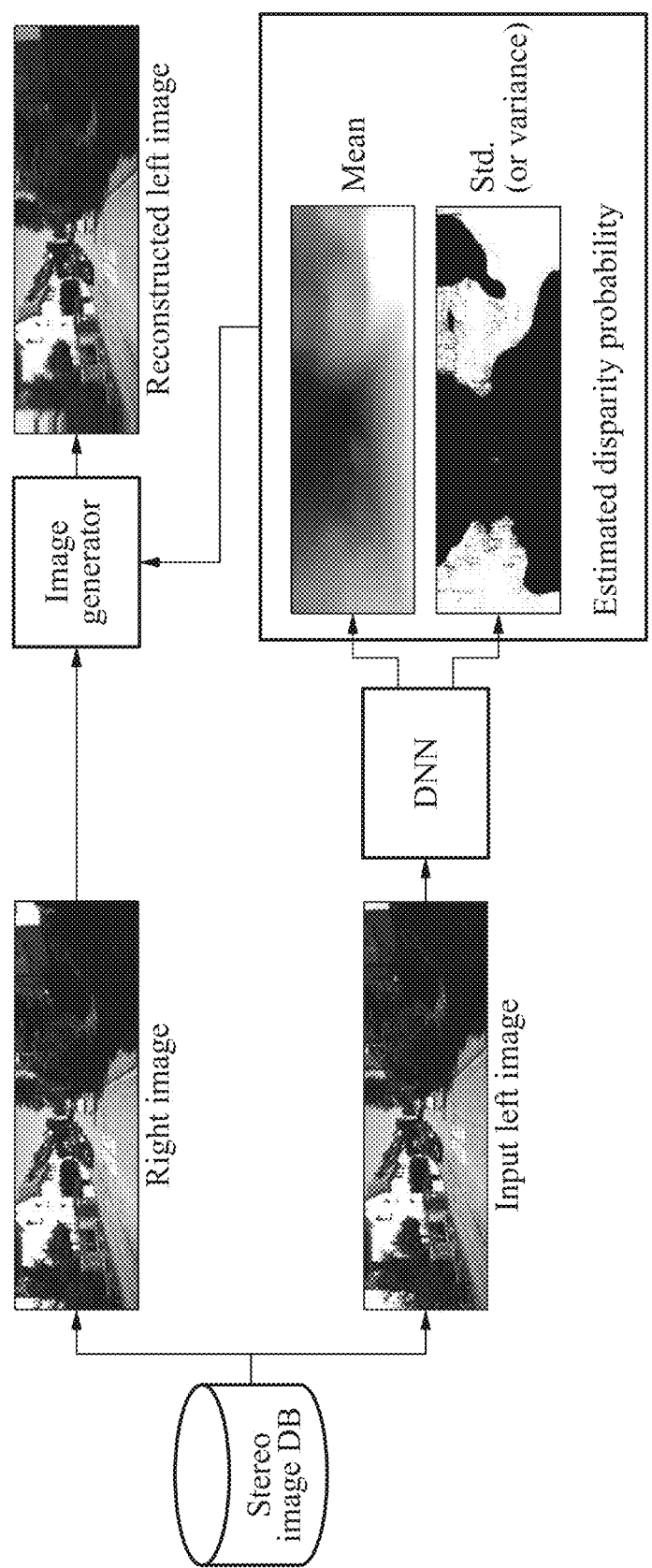
FIG. 3 illustrates an example of a process of generating an output image for training of a neural network.

FIG. 3 illustrates an example of a process of generating an output image for training of a neural network.

Referring to FIG. 3, a DNN may be trained using a training input left image, e.g., captured by a left camera as an input image, and a training right image, e.g., captured by a right camera and available as a reference image, obtained or provided from a stereo image DB in which such training data is stored. In another example, the right camera captured image may be used as the training input image, left camera captured image may be used as the reference image.

A mean as a first statistical value and a standard deviation as a second statistical value, which are associated with a depth for each pixel included in the input left image, may be obtained by applying the input left image to the DNN. An image generator may generate a reconstructed left image as an output image based on the right image and a probability distribution associated with a depth of each pixel in the input left image. The probability distribution may be a distribution of probabilities of occurrence of different values of a random variable (for example, a depth value of a corresponding pixel), and may be determined based on the mean and the standard deviation.

Figure 4:
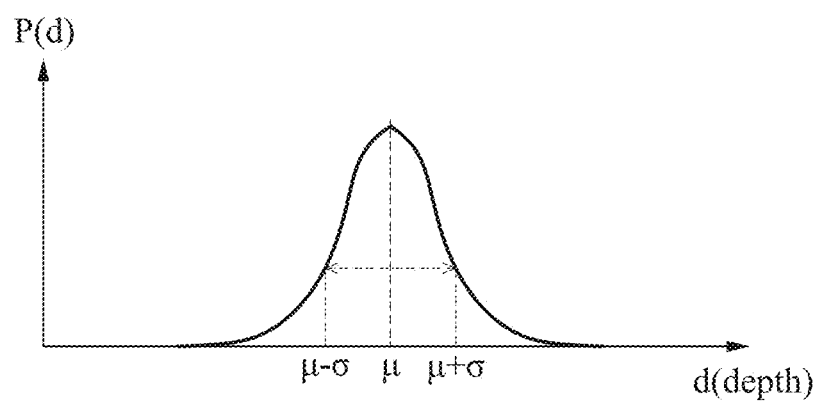
FIG. 4 illustrates an example of a probability distribution for a depth of a pixel included in an input image.

FIG. 4 illustrates an example of a probability distribution for a depth of a particular pixel included in an input image. FIG. 4 illustrates, for example, a Gaussian probability distribution based on a mean $\mu$ and a standard deviation $\pm\sigma$ of depth values of a pixel (x, y) included in the input image. The mean $\mu$ and the standard deviation $\sigma$ of the depth values of the pixel (x, y) may be statistical values output by any of the neural network examples herein. For example, the probability distribution may be obtained based on a statistical value associated with a depth of a pixel output by the neural network. Various statistical values may be output by the neural network, and various probability distributions may also be obtained based on statistical values. The probability distribution may include, for example, a Gaussian distribution or a Laplace distribution obtained based on a mean and a standard deviation or variance of depths for the example particular pixel.

Referring back to FIG. 3, the reconstructed left image as an output image may be generated by calculating a mean of pixel values in the right image corresponding to each depth based on a probability distribution associated with a depth of each pixel in the input left image. In other words, based on a probability distribution associated with a depth of a first pixel in an input image, a corresponding second pixel in an output image may be generated by calculating a weighted sum of values of pixels corresponding to a depth of a first pixel in the reference image corresponding to the input image.

For example, the output image may be synthesized by the example Equation 1 shown below.

$$Î(x, y) = E[J(x - d, y)] = \sum_d P_{x,y}(d)J(x - d, y) \quad \text{Equation 1}$$

In Equation 1, Î(x, y) denotes a pixel value of a pixel (x, y) in the output image, e.g., by the image generator of FIG. 3, J(x−d, y) denotes a pixel value in the reference image corresponding to each depth of the pixel (x, y) in the input image, and Px,y(d) denotes a probability that a disparity of the pixel (x, y) in the input image is d. As described above, the disparity of the pixel (x, y) may demonstrate or correspond to a depth of the pixel (x, y). For example, a pixel in the output image may be generated by calculating a weighted sum of pixel values of the reference image corresponding to disparities of a pixel of the input image according to a Gaussian distribution of a probability of the disparities associated with the pixel of the input image. Px,y(d) may be calculated by a Gaussian distribution associated with a disparity, as shown in the example Equation 2 below.

$$P_{x,y}(d) = \frac{1}{\sqrt{2\pi}\,\sigma(x, y)} e^{-\frac{(d-\mu(x,y))^2}{2\sigma(x,y)^2}} \quad \text{Equation 2}$$

In Equation 2, μ(x, y) denotes a mean of disparity values for the pixel (x, y) in the input image which is one of outputs of the neural network, and σ(x, y) denotes a standard deviation of disparity values for the pixel (x, y) in the input image which is another one of outputs of the neural network.

During training loss of the neural network may be generated based on a pre-defined objective function and in view of Equations 1-2, for example. The pre-defined objective function may be any of various approaches, such as, for example, an L2 loss function, a cross entropy objective function, or a softmax activation function, as nonlimiting examples.

With respect to the training of the neural network, the neural network may be trained using an objective function that is designed based on the reconstructed left image and the input left image as demonstrated in FIG. 3. For example, when an output image is generated by expressing a Gaussian distribution with a mean and a variance as the respective neural network output statistical characteristics of the estimated depth, a target objective function to for optimization of the training of the neural network may be implemented as shown in the example Equation 3 below.

$$D(x,y) = \|I(x,y) - Î(x,y)\|_2^2 \quad \text{Equation 3:}$$

In Equation 3, 1(x, y) denotes a pixel value of the pixel (x, y) in the input image, and Î(x, y) denotes a pixel value of the pixel (x, y) in the output image, again noting that Î(x, y) may be the reconstructed left image resulting from the application of the neural network's respective output statistical information to the reference image.

In other words, the neural network may be trained based on an objective function that reflects all of two or more pieces of output data representing statistical characteristics for a depth in units of pixels, e.g., respectively for each of the output pixels.

As noted above, two or more outputs of the neural network may be used to estimate depth information of an image. For example, an estimated second statistical value from the neural network may also be indicative of a confidence level of the estimation of the first statistical value, and thus, may be used as a criterion to determine whether to use the first statistical value. For example, an estimation model may determine information about the confidence level indicated by the estimated second statistical value, based on a predetermined criterion, and may determine whether to use the estimated first statistical value as an estimated depth in units of pixels. Also, the estimated second statistical value, indicative of the confidence level of the estimated first statistical value, may also be used as a criterion to determine whether to correct the estimated first statistical value. For example, when the confidence level of a particular estimated first statistical value is determined to be low, or determined to be below a first threshold, based on the corresponding estimated second statistical value, the estimation model may perform additional processing of the estimated first statistical value in units of pixels. In this example, the additional processing of the estimated first statistical value may include processing to correct the estimated first statistical value based on the estimated second statistical value. For example, the estimation model may obtain a probability distribution based on a mean, as the estimated first statistical value, and a variance, as the estimated second statistical value, and may perform random sampling based on the probability distribution, to generate a corrected first statistical value.

Figure 5:
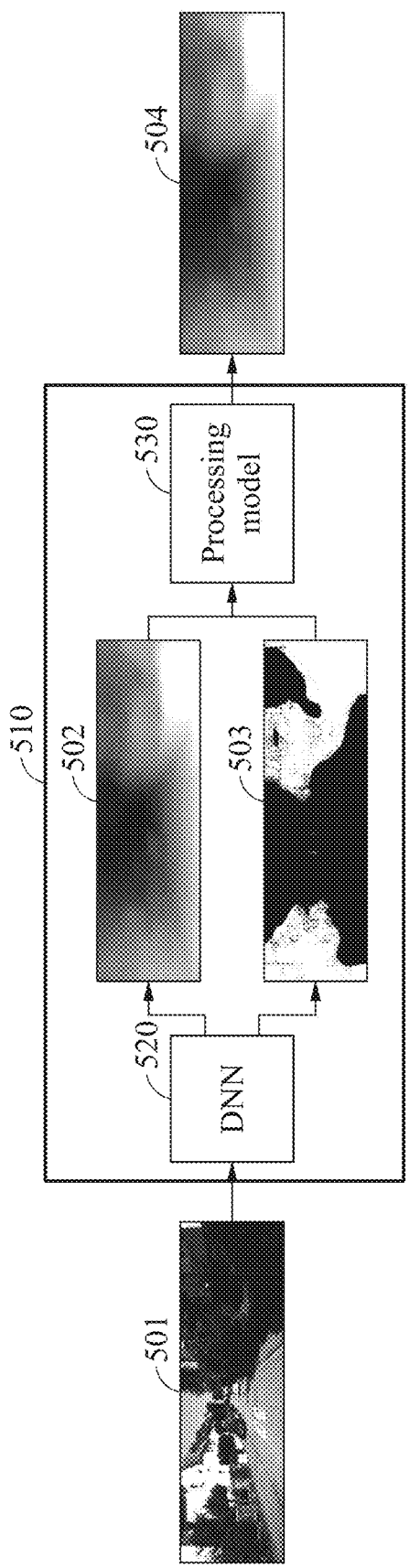
FIG. 5 illustrates an example of a configuration of a model to estimate depth information of an image based on output data of a neural network.

FIG. 5 illustrates an example of a configuration of a model to estimate depth information of an image based on output data of a neural network.

Referring to FIG. 5, an estimation model 510 may include a processing model 530 configured to process output data, of a neural network 520, including a first statistical value 502 and a second statistical value 503 and to estimate depth information 504 of an input image 501. The processing model 530 may include a learned model configured to output the depth information 504 of the input image 501 based on the output first statistical value 502 and the output second statistical value 503. The output first statistical value 502 may indicate information about depth values estimated in units of pixels, and the output second statistical value 503 may indicate a confidence level of the estimation of the output first statistical model in units of pixels. In an example, the processing model 530 may function as a filter configured to determine a confidence level of an output first statistical value based on a correspondingly output second statistical value and to select the output first statistical value in units of pixels based on the determined confidence level. In another example, the processing model 530 may perform processing to correct the output first statistical value in units of pixels based on the confidence level.

For example, when the output second statistical value is a variance of depth values for each pixel, and when a variance for a predetermined pixel is greater than a predetermined reference value, a confidence level of estimation of the pixel may be evaluated to be low. In other words, there is an inverse relationship between the variance of depth values of the output second statistical value and the confidence level of the processing model 530, e.g., as the second statistical value increases the confidence level decreases, and as the second statistical value decreases the confidence level increases. When the confidence level of the first statistical value corresponding to a predetermined pixel is evaluated to be low, the depth information estimated corresponding to the predetermined pixel may be excluded or corrected, for estimation of a depth of an image. For example, the processing model 530 may obtain a probability distribution based on a mean, as the first statistical value, and a variance, as the second statistical value, and may perform random sampling based on the obtained probability distribution, when correcting the first statistical value. When a confidence level of a predetermined pixel is evaluated to be low, the correction may be performed based on estimated depth values of pixels neighboring the pixel.

Thus, two or more pieces of output data of the neural network may be used to increase an accuracy and efficiency of training in a training process of the estimation model. In a training process of a depth estimation model, the output first statistical value corresponding to a predetermined pixel may not be used as training data, or may be transferred as training data by selectively applying postprocessing, based on the output second statistical value, and thus it is possible to prevent or reduce successive training failures due to depth estimation errors. For example, probability information of a depth for each pixel may be processed based on an output result of the neural network, and accordingly a difference between an input image and an output image, e.g., between the aforementioned left image and the reconstructed left image (reconstructed based on outputs of the in-training neural network and the right image, where the right image is the reference image), may be selectively back-propagated for each pixel.

In a training process of the neural network, based on the output second statistical value, a mask may be generated to perform training in units of pixels. In an example, a binary mask corresponding to each pixel may be generated based on the output second statistical value, and a kernel corresponding to a portion of pixels in the neural network may be deactivated by applying the binary mask to the kernel, so that a training epoch of the neural network may be performed. In another example, a weight mask corresponding to each pixel may be generated based on the output second statistical value, and a weight may be assigned to a kernel corresponding to each pixel in the neural network by applying the weight mask to the kernel, so that a training epoch of the neural network may be performed.

Also, in the training process of the neural network, based on the respectively output first statistical value and second statistical value for each pixel, a probability that an object is covered by or obscures another object in the input image may be calculated for each pixel of the input image. For example, based on a probability of an object being covered by another object which is calculated for each pixel, a binary mask corresponding to each pixel or a weight mask having a value between "0" and "1" for each pixel may be generated. In this example, an accuracy of training may be increased by applying a generated mask to a loss of the neural network.

For example, in a process of reconstructing or synthesizing an object corresponding to a k-th pixel in an input image, e.g., captured by a left camera and stored in a stereo image DB in which training data is stored, to measure a reconstruction loss of the neural network, a pixel value of a reference image, e.g., captured by the right camera spaced apart from the left camera and stored in the stereo image DB, from a position of the k-th pixel may be fetched. As the example right camera is spaced apart from the example left camera, there will be a disparity between the corresponding images captured by the right camera and the left camera. In this example, when a plurality of objects overlap in a direction that a camera used to capture the reference image faces, one object among the plurality of objects may be covered by an object located in front of the object, which may cause an incorrect calculated loss and thus an incorrect loss back-propagation in training. Accordingly, a mask may be generated by calculating a probability of an object corresponding to each pixel being covered by another object, and the generated mask may be applied to a loss of the neural network, to increase the accuracy of the training.

Based on a distribution obtained based on the output first statistical value and the output second statistical value of each pixel of an input image, a probability of an object corresponding to each pixel being covered by another object may be calculated by the example Equation 4 shown below.

$$Pr(v_k = 1) = \sum_{\hat{z}} Pr(v_k = 1 \mid z_k = \hat{z}) = \sum_{\hat{z}} \prod_{j=1,2,...,J} Pr(z_{k+j} \neq \hat{z} + j) \quad \text{Equation 4}$$

In Equation 4, it is assumed that a disparity is estimated from an image captured by a left camera, e.g., in the stereo image DB storing the training data. In Equation 4, k denotes an index of a pixel, e.g., where each of the pixels of the image are separately indexed, vk denotes a visibility or a probability that an object corresponding to a pixel k is not covered, z denotes a disparity, J denotes a search range, and j and $\hat{z}$ denotes dummy variables. The probability vk may have a value opposite to a probability that an object corresponding to each pixel is covered by another object. For example, the probability vk having a value of "1" may indicate that the object corresponding to the pixel k is not covered by another object, and the probability vk having a value of "0" may indicate that the object corresponding to the pixel k is covered by another object.

In other words, Equation 4 demonstrates an example calculation of a probability that a k-th pixel and a (k+j)-th pixel do not reference a value of a same pixel position of the reference image, and accordingly a value of the k-th pixel may be properly reconstructed if the value of the probability vk is high. The probability calculated by Equation 4 may be used to generate a map based on a binary mask, and a probability value with a value between "0" and "1" may be used as a weight.

Thus, a plurality of pieces of data output from the neural network may be used to enhance performance and training efficiency of the neural network, and may contribute to accurate estimation of the first statistical value for each pixel.

Also, an output of the neural network including the first statistical value and the second statistical value may be variously applied to a technology of estimating and using depth information of an image, in various embodiments. For example, when an output of the neural network includes a first statistical value indicating information about an estimated depth value of a particular pixel and a second statistical value indicating information about a confidence level of the estimation for the first statistical value of the particular pixel, for each pixel, such depth values and confidence levels information may be transmitted to, or further considered in, various algorithms that use depth information of an image as inputs, to contribute to enhancement in overall performance of the algorithms.

Figure 6:
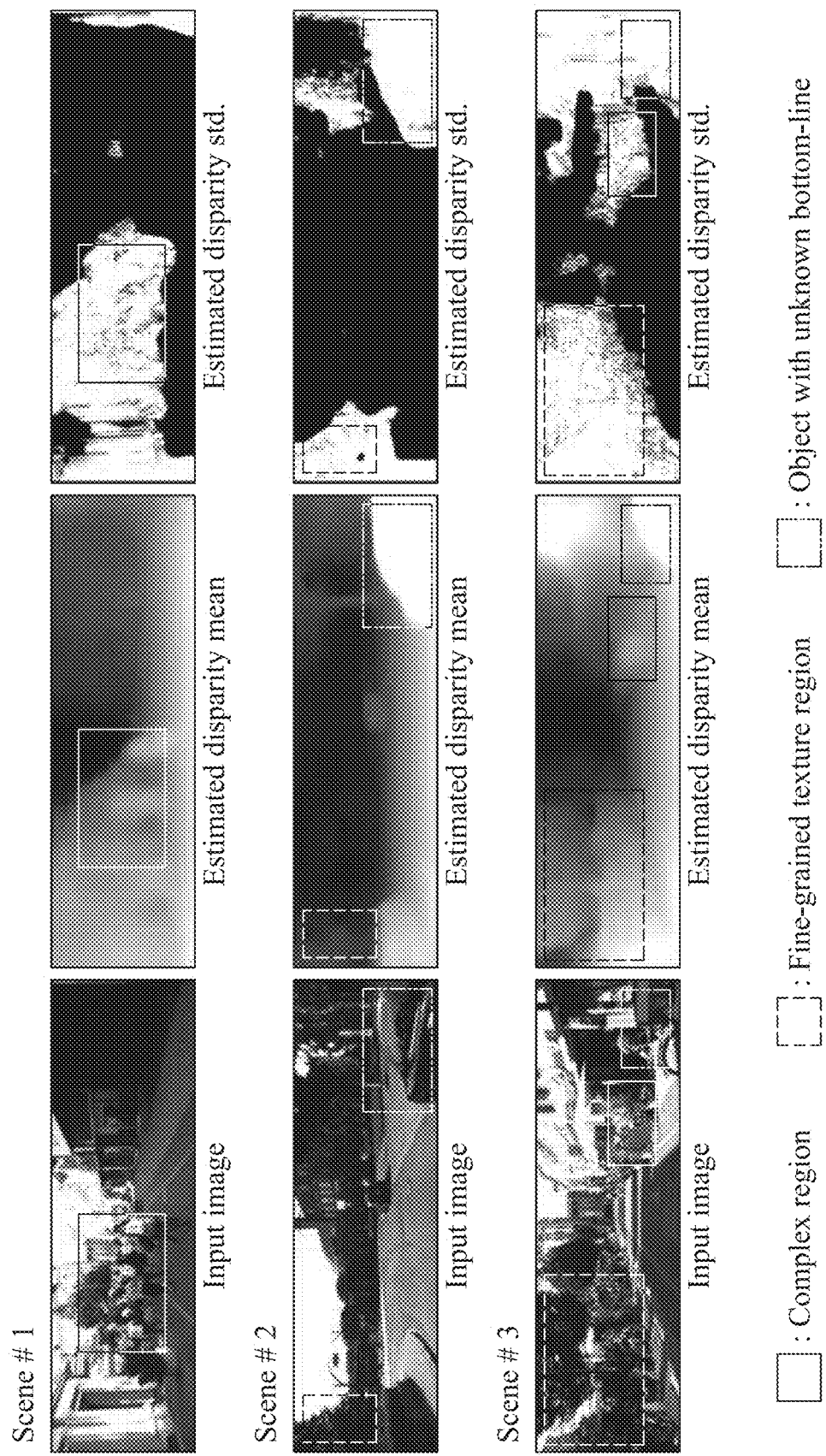
FIG. 6 illustrates an example of an output image obtained by inputting an input image to an estimation model.

FIG. 6 illustrates an example of an output image obtained by inputting an input image to an estimation model.

Referring to FIG. 6, an output image may include an image representing respective means of depth values or disparity values for each pixel in an input image, and an image representing respective standard deviations of the depth values or disparity values. Based on the image representing the respective standard deviations of the depth values, respective confidence levels of the corresponding means of estimated depth values may be evaluated. In the illustrated examples, an increase in illustrated brightness of the output image for the respective standard deviations of the depth values represents corresponding increases in standard deviations, and as the standard deviations increase the corresponding confidence levels decrease. Also, in the illustrated examples, a decrease in the illustrated brightness of the output image for the respective standard deviations of the depth values represents corresponding decreases in standard deviations, and as the standard deviations decrease the corresponding confidence levels increase.

Typical depth estimations for regions, e.g., a complex region, a fine-grained texture region, and an object with unknown bottom-line, of the input images of scenes 1-3 are generally difficult. For example, for typical approaches, such bright region areas in any of the estimated disparity means of FIG. 6 would mean that the confidence levels of a typical estimated depth using such disparity means would be low. Said another way, the bright region areas in the FIG. 6 are regions whose depths would be typically difficult to determine using typical approaches.

However, FIG. 6 illustrates that for such regions, e.g., the illustrated complex regions, illustrated fine-grained texture regions, and illustrated objects with unknown bottom-line, as only non-limiting examples, respective depths can be confidently estimated using output images representing the respective standard deviations of the depth values, even where the corresponding estimated disparity mean or estimated disparity standard deviation is demonstrated as being relatively bright in the illustrated scenes 1-3. In other words, referring to the regions shown in FIG. 6, in example embodiments, a second statistical value output from the neural network may be used as confidence level information associated with depth estimation associated with the estimated disparity mean output images of the illustrated scenes 1-3. Thus, it is possible to obtain an effect of enhancing the accuracy of depth estimation as well as a training efficiency by using two or more statistical values of the neural network in depth estimation of an image using an estimation model and during the training process of the neural network in the estimation model.

Figure 7:
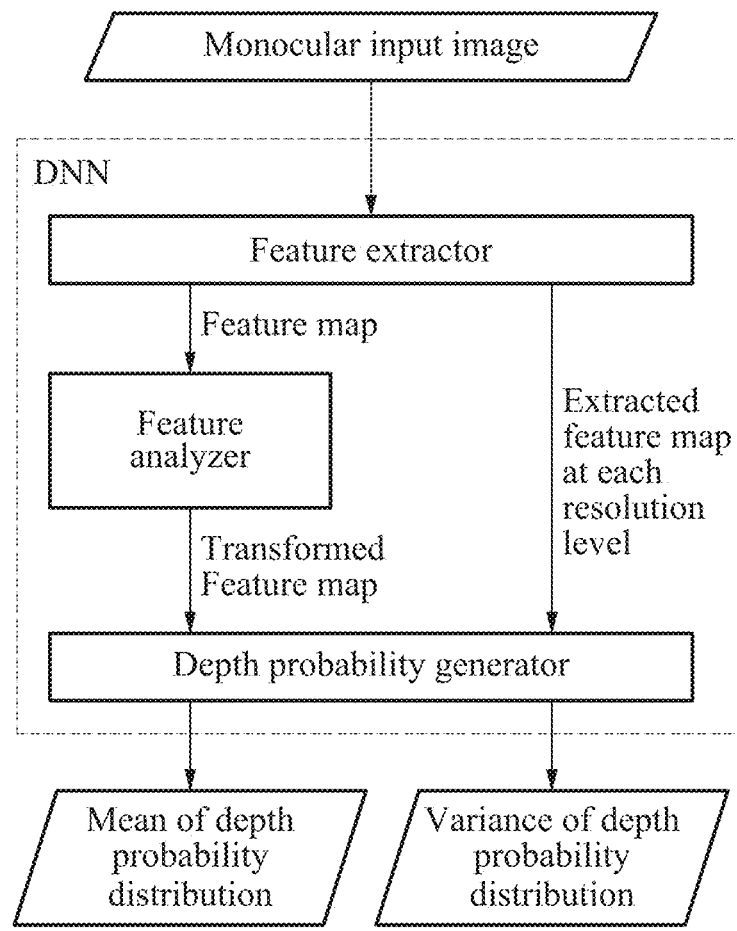
FIG. 7 illustrates an example of an inference process of a model to estimate a depth of an image.

FIG. 7 illustrates an example of an inference process of a model to estimate a depth of an image.

Referring to FIG. 7, an estimation model may include a DNN, and an input image may be a monocular input image. In an example, the estimation model may also receive, as input images, stereo images that are two or more images obtained by capturing the same object in different locations. In such a stereo image example, the estimation model may be used to obtain depth information for at least one pixel in which stereo matching is not performed in the stereo images or where stereo matching does not result in accurate depth estimation. For example, in an example stereo matching of an input image may be performed, e.g., based on geometric relationships between the two images, but some depths in this process may be determined to not be available or sufficiently reliable, in which case the estimation model of FIG. 7 can be performed using either or both of the input images, or only depth estimation using the example estimation model may be performed without any stereo matching.

Referring to FIG. 7, the estimation model may extract a feature map by applying an input image to a feature extractor portion of the DNN, e.g., the feature extractor portion including at least one layer in the DNN. The extracted feature map may be transformed and processed to be suitable for probability estimation for a depth by passing a result of the feature extraction to a feature analyzer portion of the DNN, e.g., the feature analyzer portion including at least one layer in the DNN. The extracted feature map and/or the transformed and processed feature map may be provided to a depth probability generator portion of the DNN, e.g., the depth probability generator portion of the DNN including at least one layer of the DNN, to finally output respective means of depth probability distributions as respective first statistical values and respective variances of the depth probability distributions as respective second statistical values in association with the depths of each of the pixels in the input image. Here, though the feature extractor portion, the feature analyzer portion, and the depth probability generator portion are described as portions of the DNN, the respective portions may be different networks, or variously combined networks.

The estimation model may estimate depth information of each pixel of an image based on the corresponding first statistical values and second statistical values of each pixel. The depth information of the image may be variously considered with 3D information of the image in various embodiments. For example, the depth information of the image may be used in an embodiment to generate a 3D image, or generate 3D location information corresponding to at least one of a terminal used to capture the input image and a surrounding object included in the input image.

Figure 8:
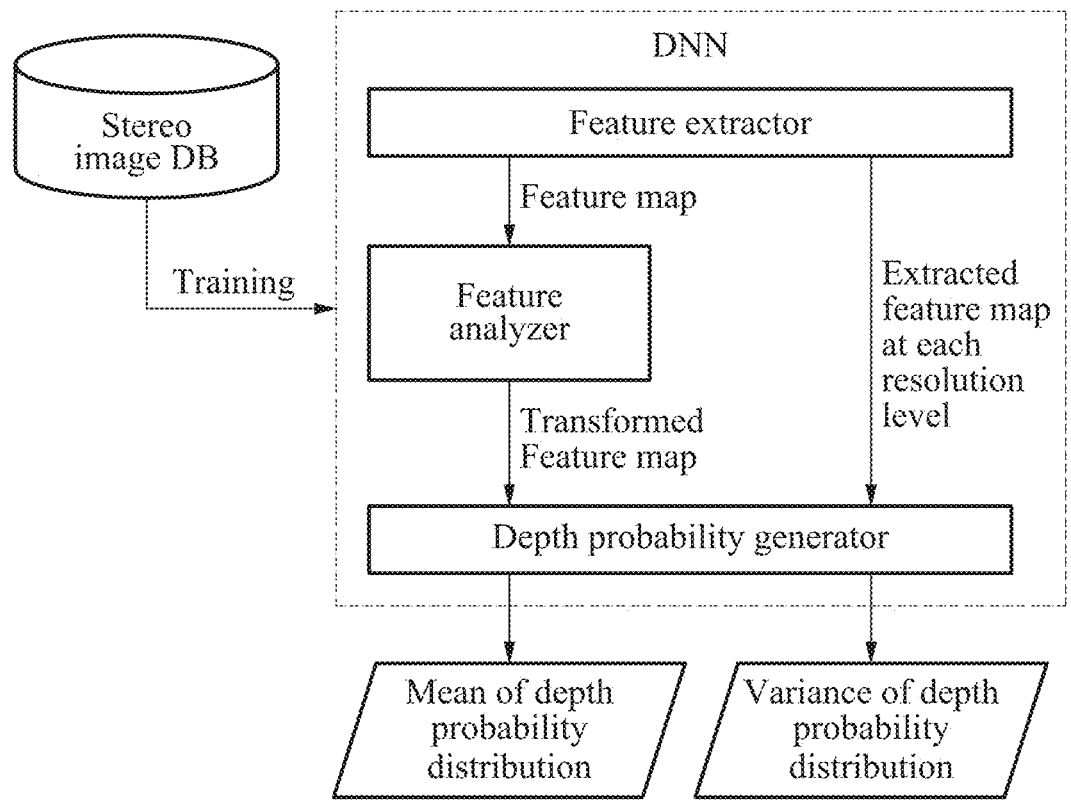
FIG. 8 illustrates an example of a training process of a model to estimate a depth of an image.

FIG. 8 illustrates an example of a training process of a model to estimate a depth of an image.

Referring to FIG. 8, training data for training of an estimation model may include stereo images stored in the stereo image DB. The training data may also include a monocular video. For example, when a reference image includes a monocular video, the reference image information may further include pose information of a camera, for example, an angle and a location at which a camera that captured the video. When a monocular video is included in the training data, information used to obtain depth information of frame images constituting the monocular video may be further included in the training data.

Referring to FIG. 8, the estimation model may be trained, based on the training data, to output a first statistical value and a second statistical value associated with a depth of an input image.

Figure 9:
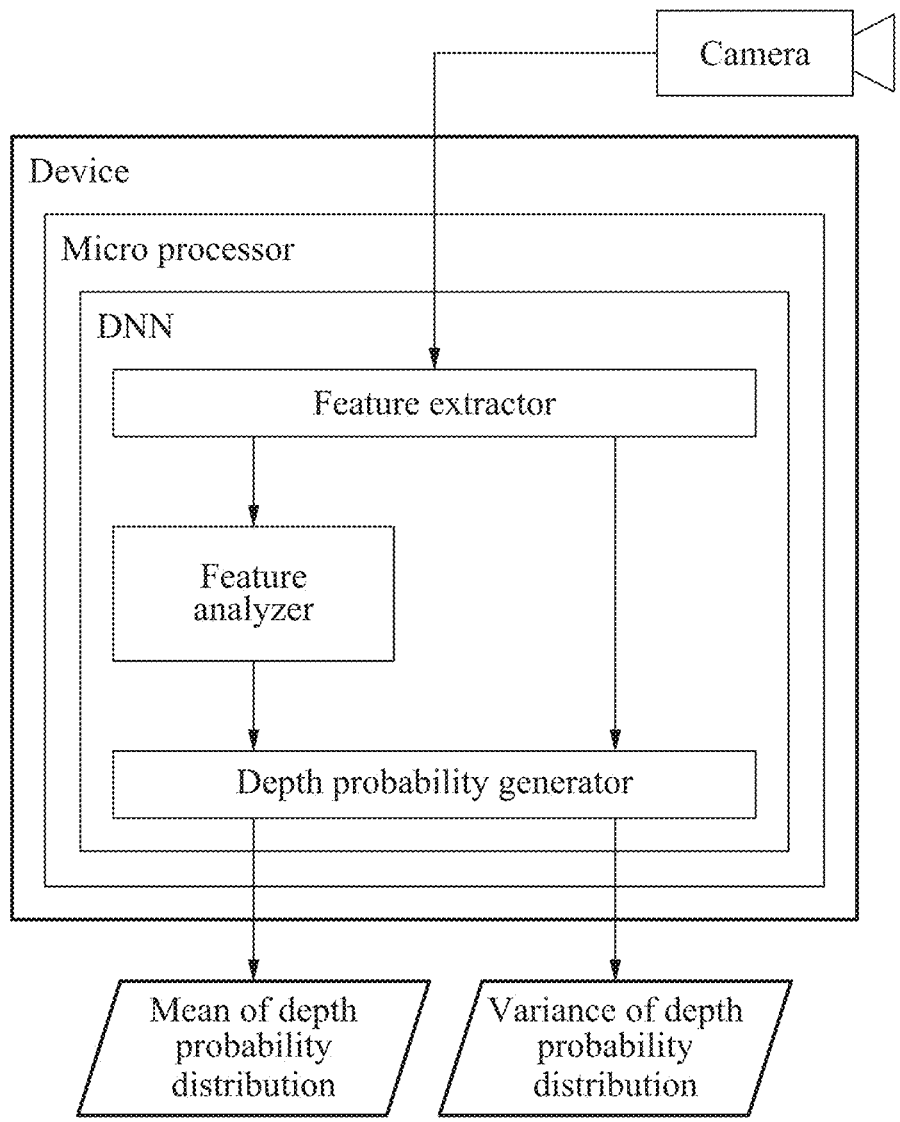
FIG. 9 illustrates an example of an apparatus with image depth estimation.

FIG. 9 illustrates an example of an apparatus with image depth estimation.

Referring to FIG. 9, the apparatus may output depth information associated with an input image, using any of the above-described estimation models. The apparatus of FIG. 9 may include at least one processor configured to estimate a depth of the input image using the depth estimation model. The depth estimation model may be a model configured to estimate depth information of an input image using a neural network as described above, for example.

For example, an estimation model to estimate a depth of an image may be implemented by a semiconductor chip or other hardware of an example apparatus that uses 3D information of an image, to perform depth estimation of the image. In an example, the estimation model implemented in the hardware form, as the chip, may be, or mounted in, a monocular depth sensor of an example vehicle, and examples include the provision of services related to the driving of an example vehicle implementing the estimation model, for example, examples that include the generation of 3D location information with an object in vicinity of the vehicle, based on depth information estimated in a monocular image captured in the vehicle. In another example, the estimation model implemented in the hardware form, as the chip, may be, or mounted in, augmented reality (AR) glasses, and may provide an AR-related service, for example, generation of 3D location information, based on depth information estimated from a 2D input image.

As a non-limiting example, the depth estimation model may be configured as a DNN as shown in FIG. 2, and respective plurality of layers included in the DNN may be related to respective functions, for example, feature extraction, feature analysis, and depth probability generation, performed in the DNN. Although a plurality of layers included in each of the DNNs may be classified according to functions as shown in FIGS. 7 through 9, configurations of the DNNs are not necessarily limited thereto.

Thus, examples relate to a technology of estimating a depth of an image based on a neural network trained to output two or more statistical values associated with depths for each pixel in the image, to provide a technological improvement over previous approaches that perform stereo matching.

One or more examples further relate to a technology of training the neural network to output the two or more statistical values associated with depths for each pixel in an image by using an objective function to allow two or more pieces of output data to have statistical characteristics.

The estimation model devices and apparatuses, neural networks, deep neural networks, network portions, neural network apparatuses, databases, stereo image databases, the image generator, cameras, feature extractors, feature analyzers, depth probability generators, microprocessor, neural network processor, in-memory processors, and other apparatuses, devices, modules, and components described herein with respect to FIGS. 1 through 9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD- ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers. Referenced one or more processors and processor-implemented methods also include examples of in-hardware, in-memory processing, other hardware array or MAC calculation implementations, as non-limiting examples, and thus, referenced processor-implemented methods may be implemented through hardware and instructions, or hardware alone.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A neural network apparatus, the apparatus comprising:
   a camera configured to capture an input image; and
   one or more processors configured to:
      apply the input image to a neural network;
      obtain a first statistical value associated with a depth of a pixel included in the input image;
      obtain another first statistical value associated with a depth of another pixel included in the input image;
      obtain a second statistical value associated with the depth of the pixel included in the input image; and
      obtain another second statistical value associated with the depth of the other pixel included in the input image;
      estimate depth information of the pixel included in the input image based on the first statistical value and the second statistical value; and
      estimate depth information of the other pixel included in the input image based on the other first statistical value and the other second statistical value,
   wherein the first statistical value and the other first statistical value are of a same first type of statistical value, and the second statistical value and the other second statistical value are a same second type of statistical value different from the first type of statistical value.

2. The apparatus of claim 1, wherein the second statistical value represents a confidence in the first statistical value, and the other second statistical value represents a confidence in the other first statistical value.

3. The apparatus of claim 2, wherein the second statistical value is a standard deviation or variation for the depth value of the pixel included in the input image, and the other second statistical value is a standard deviation or variation for the depth value of the other pixel included in the input image.

4. The apparatus of claim 2, wherein the one or more processors are further configured to:
   selectively, dependent on the represented confidence by the second statistical value, perform a correction of the first statistical value; and
   selectively, dependent on the represented confidence by the other second statistical value, perform a correction of the other first statistical value.

5. The apparatus of claim 4, wherein the one or more processors are further configured to:
   generate a reconstructed input image from a reference image, the generating being dependent on the first statistical value, the second statistical value, the other first statistical value, and the other second statistical value; and
   perform training of the neural network based on a comparison result of the generated reconstructed input image and the input image.

6. The apparatus of claim 1,
   wherein the first statistical value and the other first statistical value are obtained from image information output by the neural network as a first channel with the first statistical value and the other first statistical value, and
   wherein the second statistical value and the other second statistical value are obtained from image information output by the neural network as a second channel with the second statistical value and the other second statistical value.

7. A neural network method, the method comprising:
   obtaining a first statistical value associated with a depth for each of plural pixels included in an input image based on a first channel of output data obtained by applying the input image to a neural network;
   obtaining a second statistical value associated with a depth for each of the plural pixels in the input image based on a second channel of the output data; and
   estimating depth information of each of the plural pixels in the input image based on the first statistical value and the second statistical value.

8. The method of claim 7, wherein
   each first statistical value comprises a mean of depth values of a corresponding each of the plural pixels in the input image, based on probabilities of the depth values, and
   each second statistical value comprises a variance or a standard deviation of the depth values of the corresponding each of the plural pixels in the input image, based on the probabilities of the depth values.

9. The method of claim 7, wherein the estimating of the depth information comprises:
   determining a confidence level of each of the first statistical values based on a corresponding second statistical value for each of the plural pixels in the input image; and
   respectively determining whether to use each of the first statistical values as depth information based on the correspondingly determined confidence level of each of the first statistical values.

10. The method of claim 9, wherein, with respect to the determining of the confidence level of each of the first statistical values,
there is an inverse relationship between the determined confidence levels and the corresponding second statistical values in that when values of second statistical values increase corresponding confidence levels decrease, and when other values of the second statistical value decrease corresponding confidence levels increase.

11. The method of claim 7, wherein the estimating of the depth information comprises:
obtaining a probability distribution based on a first statistical value for a depth of a pixel in the input image and a corresponding second statistical value of the first statistical value for the depth of the pixel; and
performing random sampling based on the probability distribution to correct the first statistical value for the pixel.

12. The method of claim 11, wherein the performing of the random sampling is selectively performed dependent on a confidence level, of the first statistical value for the depth of the pixel, as represented by the corresponding second statistical value.

13. The method of claim 7, further comprising:
capturing the input image using a camera of a terminal; and
generating three-dimensional (3D) location information corresponding to the terminal and a surrounding object included in the input image, based on the estimated depth information.

14. The method of claim 7, wherein the input image comprises at least one of a monocular image and a stereo image.

15. A non-transitory computer-readable storage medium storing instructions that, when executed by a processor, cause the processor to perform the method of claim 7.

16. A neural network method, the method comprising:
obtaining a first statistical value and a second statistical value associated with a depth, for each of plural pixels included in an input image, by applying the input image to a neural network;
obtaining a probability distribution for a depth of each of the plural pixels in the input image, based on the first statistical value and the second statistical value; and
training the neural network using an objective function that is based on the obtained probability distribution and predetermined depth information of each of the plural pixels in the input image.

17. The method of claim 16, wherein
each first statistical value comprises a mean of depth values of a corresponding each of the plural pixels in the input image, based on probabilities of the depth values, and
each second statistical value comprises a variance or a standard deviation of the depth values of the corresponding each of the plural pixels in the input image, based on the probabilities of the depth values.

18. The method of claim 16, wherein the obtaining of the first statistical value and the second statistical value comprises:
obtaining each of the first statistical values based on a first channel of output data of the neural network to which the input image is applied; and
obtaining each of the second statistical values based on a second channel of the output data.

19. The method of claim 16,
wherein the obtaining of the first statistical value includes applying a feature map, extracted from the input image by a previous portion of the neural network, to a first network included in the neural network; and
wherein the obtaining of the second statistical value includes applying the feature map to a second network included in the neural network.

20. The method of claim 16, wherein the training of the neural network comprises:
estimating depth information of each of the plural pixels in the input image based on the probability distribution and a reference image corresponding to the input image; and
training the neural network using an objective function that is based on the estimated depth information and the predetermined depth information of each of the plural pixels in the input image.

21. The method of claim 20, wherein the reference image comprises at least one of:
a stereo image; and
a monocular video and pose information of a camera used to capture the monocular video.

22. The method of claim 16, wherein the training of the neural network further comprises obtaining the predetermined depth information, of each of the plural pixels in the input image, based on the input image and a reference image corresponding to the input image.

23. The method of claim 16, wherein the training of the neural network comprises:
synthesizing an output image based on the probability distribution and a reference image corresponding to the input image; and
training the neural network using an objective function that is based on the input image and the synthesized output image.

24. The method of claim 23, wherein the synthesizing of the output image comprises, based on a probability distribution for a depth of a first pixel in the input image and pixels corresponding to the depth of a corresponding first pixel in the reference image, generating a second pixel in the output image corresponding to the first pixel.

25. The method of claim 24, wherein the generating of the second pixel comprises generating the second pixel by calculating a weighted sum of values of the pixels corresponding to the depth of the corresponding first pixel in the reference image, based on the probability distribution for the depth of the first pixel.

26. The method of claim 23, wherein the training of the neural network comprises training the neural network using an objective function for minimizing a difference between a first pixel in the input image and a corresponding first pixel in the output image.

27. The method of claim 16, wherein the training of the neural network comprises:
generating a mask corresponding to each of the plural pixels in the input image, based on the respective first statistical value and the respective second statistical value; and
training the neural network using the mask and the objective function.

28. The method of claim 16, wherein the training of the neural network comprises performing optimization of parameters for each of plural layers in the neural network, dependent on the objective function.

29. The method of claim 16, wherein the input image comprises at least one of a monocular image and a stereo image.

30. A non-transitory computer-readable storage medium storing instructions that, when executed by a processor, cause the processor to perform the method of claim 16.

31. A neural network apparatus, the apparatus comprising:
one or more processors configured to:
  obtain a first statistical value associated with a depth for each of plural pixels included in an input image based on a first channel of output data obtained by applying the input image to a neural network;
  obtain a second statistical value associated with a depth for each of the plural pixels in the input image based on a second channel of the output data; and
  estimate depth information of each of the plural pixels in the input image based on the first statistical value and the second statistical value.

32. The apparatus of claim 31, wherein
each first statistical value comprises a mean of depth values of a corresponding each of the plural pixels in the input image, based on probabilities of the depth values, and
each second statistical value comprises a variance or a standard deviation of the depth values of the corresponding each of the plural pixels in the input image, based on the probabilities of the depth values.

33. The apparatus of claim 31, wherein, for the estimation of the depth information, the one or more processors are configured to:
  determine a confidence level of each of the first statistical values based on a corresponding second statistical value for each of the plural pixels in the input image; and
  respectively determine whether to use each of the first statistical values as depth information based on the correspondingly determined confidence level of each of the first statistical values.

34. The apparatus of claim 31, further comprising a camera configured to capture the input image,
wherein the one or more processors are configured to generate three-dimensional (3D) location information corresponding to the apparatus and a surrounding object included in the input image, based on the estimated depth information.

35. The apparatus of claim 31, wherein the input image comprises at least one of a captured monocular image and an image of a captured stereo image.

36. The apparatus of claim 31, wherein the one or more processors are further configured to train the neural network based on a probability distribution that is obtained corresponding to a first image in training data based on obtained first statistical values and second statistical values that are associated with a depth of each pixel in the first image.

37. The apparatus of claim 31,
wherein, for the obtaining of the first statistical values, the one or more processors are configured to obtain each of the first statistical values from a first channel of output data of the neural network to which the input image is applied,
wherein, for the obtaining of the second statistical values, the one or more processors are configured to obtain each of the second statistical values from a second channel of the output data of the neural network, and
wherein the output of the neural network represents the neural network as having been trained on a probability distribution that is obtained corresponding to a first image in training data based on obtained first statistical values and second statistical values that are associated with a depth of each pixel in the first image.

* * * * *